United States Patent
Jones

[11] Patent Number: 5,930,738
[45] Date of Patent: Jul. 27, 1999

[54] VEHICLE COMPUTER SYSTEM ENVIRONMENT MONITOR

[75] Inventor: Charles K. Jones, Anaheim, Calif.

[73] Assignee: Mobile Integrated Tecnologies, Inc., Anaheim, Calif.

[21] Appl. No.: 08/953,857

[22] Filed: Oct. 15, 1997

[51] Int. Cl.⁶ .................................................. H02H 11/00
[52] U.S. Cl. ................ 702/132; 395/750.01; 360/97.02; 361/140
[58] Field of Search ..................... 702/132, 130, 702/136; 364/528.34; 395/750.01, 750.02, 750.08; 360/97.02; 361/23, 139, 140

[56] References Cited

U.S. PATENT DOCUMENTS

| | | | |
|---|---|---|---|
| 5,115,225 | 5/1992 | Dao et al. ............................... | 340/584 |
| 5,274,797 | 12/1993 | Barlow et al. .......................... | 395/575 |
| 5,434,737 | 7/1995 | Miura ...................................... | 360/133 |
| 5,477,417 | 12/1995 | Ohomori et al. ....................... | 361/695 |
| 5,557,550 | 9/1996 | Vigil et al. .............................. | 364/557 |
| 5,560,022 | 9/1996 | Dunstan et al. ........................ | 395/750 |
| 5,566,077 | 10/1996 | Kulakowski et al. .................. | 364/480 |
| 5,598,395 | 1/1997 | Watanabe ................................ | 369/116 |
| 5,623,594 | 4/1997 | Swamy .................................... | 395/180 |
| 5,714,870 | 2/1998 | Dunstan .................................... | 320/43 |
| 5,721,837 | 2/1998 | Kikinis et al. .......................... | 395/281 |
| 5,732,268 | 3/1998 | Bizzarri .................................... | 395/652 |
| 5,760,563 | 6/1998 | Bennett et al. ......................... | 318/641 |

*Primary Examiner*—Patrick Assouad
*Attorney, Agent, or Firm*—Lynn & Lynn

[57] ABSTRACT

A combination of software and hardware in a computer system prevents a hard disk from starting if an environmental parameter (i.e. temperature) is outside operational limits. An extension to the basic input/output software normally used with IBM-PC architecture processes signals indicative of the ambient environmental parameter. The extension to the basic input/output software is added to silicon memory in the computer instead of being stored on the hard drive. Upon initial application of electrical power to the computer the hard drive is disabled while the extension determines whether the environmental parameter is within an acceptable limit. The extension enables the hard drive and allows the boot process to proceed only if the environmental parameter is within the limiting value.

12 Claims, 1 Drawing Sheet

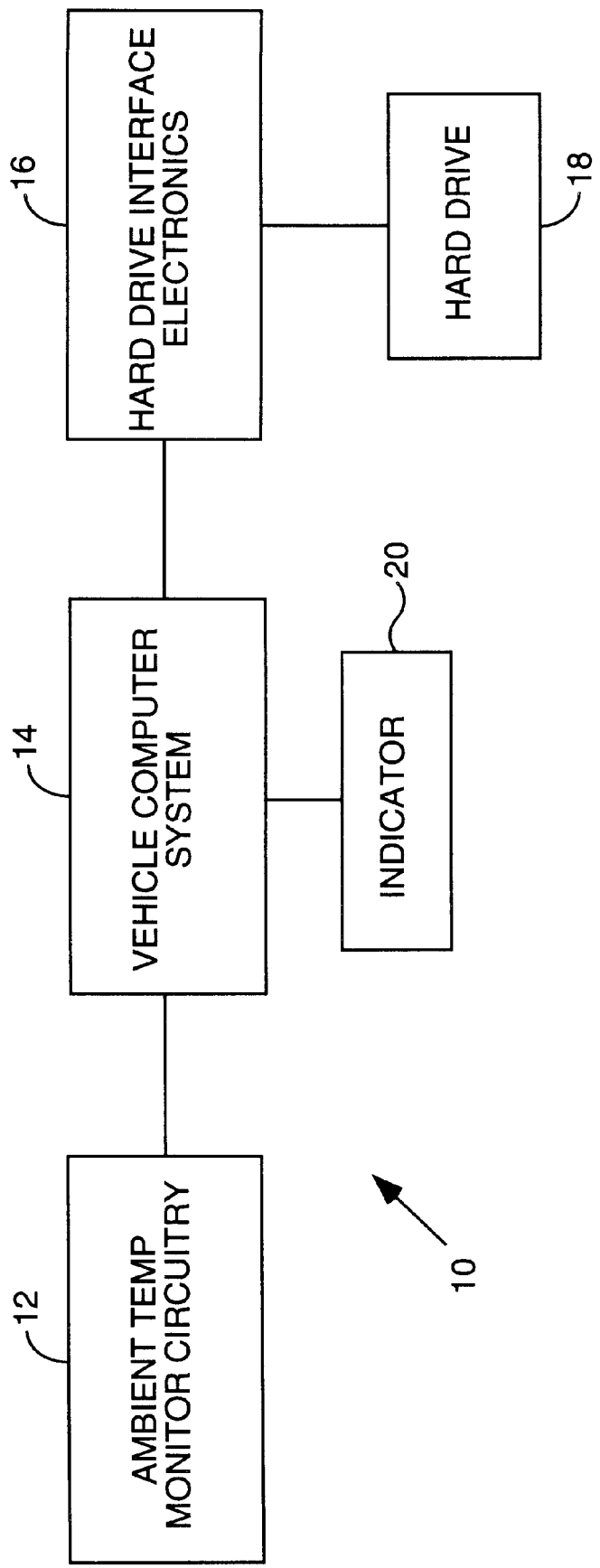

VEHICLE COMPUTER SYSTEM ENVIRONMENT MONITOR

BACKGROUND OF THE INVENTION

This invention relates generally to computers used in environments where temperature extremes are likely to be outside normal operating parameters. This invention relates particularly to protection of data stored in a computer used in an extreme environment such as a motor vehicle. Still more particularly, this invention relates to apparatus and methods for preventing a computer storage device from starting up if an environmental parameter is beyond its operational limit.

As computer technology has advanced, computer systems have begun finding use in non-traditional applications. One of these applications is on board vehicles, such as automobiles, where computers are used for everything from engine monitoring to computer-aided dispatching. As the data contained in these computers becomes more vital, it becomes more and more critical to safeguard this data. Computers used in vehicle environments must contend with extremes in temperature that are outside normal operating parameters. These extremes in temperature can cause the computer system to malfunction and suffer failures ranging from component damage to loss of data. One of the most sensitive components in a typical computer system is the hard disk, which unfortunately is also one of the most critical components since it holds all data for the computer system. The data can be many times more valuable than the computer system hardware.

The prior art includes devices for protecting central processing units, cache memories and associated integrated circuits. However, the prior art fails to provide protection to the main data storage component, such as a hard disk drive, of a computer system used in an extreme environment such as a motor vehicle.

U.S. Pat. No. 5,623,594, which issued Apr. 22, 1997 to Swamy is directed to a system for monitoring the temperature of a heat-producing electronic device such as a microprocessor. The temperature monitoring apparatus comprises a thermistor embedded in the circuit board in which the microprocessor is mounted. The thermistor is formed of an electrically conductive trace 140 that has a temperature-dependent property. Circuitry is connected to the thermistor to measure the electrical property and produce a warning signal if the temperature becomes too high.

U.S. Pat. No. 5,598,395, which issued Jan. 28, 1997 to Watanabe is directed to a system for preventing data loss in a cache memory when the temperature of an optical recording medium (magneto-optical disk) is abnormal. At normal operating temperatures a write cache memory temporally stores information to be stored on the disk. The temperature of the disk is monitored by a temperature sensor and a microprocessor. If the temperature is too high, then the microprocessor disables the write cache memory.

U.S. Pat. No. 5,590,061, which issued Hollowell, II et al. is directed to thermal management in a computer system. A temperature sensor and microcontroller monitor the system temperature. If the temperature is too high, then power cycling is performed on selected integrated circuits to lower their duty cycles until the temperature is within a selected limit.

U.S. Pat. No. 5,477,417 which issued Dec. 19, 1995 to Ohmori discloses an electronic device such as a computer CPU that includes a thermistor for detecting temperature, logic circuitry for deciding whether the temperature is too high, a cooling system and an alarm unit.

SUMMARY OF THE INVENTION

The present invention provides protection of the hard disk drive of the computer system and hence the data contained within the drive. One of the difficulties of having a computer system itself monitor environmental conditions is that before an application can be executed on the computer. The computer must first load system level software such as the operating system. This software is usually stored on the disk drive, which is the device that this invention protects. Thus protection software cannot be located on the hard disk.

This invention comprises a combination of software and hardware that prevents the hard disk from starting if the environmental parameter (i.e. temperature) is outside operational limits. This invention provides an extension to the basic input/output software (BIOS) normally used with IBM-PC architecture. The extension to the BIOS is added to silicon memory in the computer instead of being stored on the hard drive.

A method according to the present invention for booting a computer system that includes a disk drive and that uses BIOS for controlling the computer during the boot process comprising the steps of:

(a) applying electrical power to the computer; (b) disabling the hard drive; (c) providing to the computer a signal indicative of an ambient environmental parameter; (d) providing an extension in the BIOS for processing the signal indicative of the ambient environmental parameter to determine whether it is within a predetermined limit for operating the disk drive; and (e) proceeding with the boot process and enabling the hard drive only if the ambient environmental parameter is within the predetermined limit.

The method according to the present invention preferably further comprises the step of activating an indicator to notify a user of the computer when the ambient environmental parameter is outside the predetermined limit.

The method according to the present invention preferably further comprises the steps of continuously monitoring the ambient environmental parameter after it has been found to be outside the predetermined limit to determine when the ambient environmental parameter changes to a value that is within the predetermined limit; and enabling the disk drive after the environmental parameter is within the predetermined limit.

A system according to the present invention for protecting data stored in a disk drive included in a computer system that uses basic input/output software (BIOS) stored in a read only memory in the computer system for controlling the computer system during the boot process, comprises (a) an ambient temperature monitor arranged to provide to the computer a signal indicative of a numerical value of the ambient environmental parameter upon initial application of electrical power to the computer system; (b) disk drive interface circuitry connected between the compute and the disk drive and arranged to disable the hard drive so that it is isolated from the computer upon initial application of electrical power to the computer system: and (c) an extension in the BIOS for processing the signal indicative of the ambient temperature to determine whether it is within a predetermined limit for operating the disk drive for enabling the hard drive only if the ambient temperature is within the predetermined limit.

An appreciation of the objectives of the present invention and a more complete understanding of its structure and method of operation may be had by studying the following description of the preferred embodiment and by referring to the accompanying drawings.

BRIEF DESCRIPTION OF THE DRAWING

The FIGURE is block diagram of a vehicle computer system environment monitor according to the present invention

DESCRIPTION OF THE PREFERRED EMBODIMENT

This disclosure describes an apparatus and a method for making and using a vehicle computer system environment monitor and disabling the hard drive to if a selected environmental parameter is outside the limits for safe operation. Specific details are disclosed to provide a thorough description of the invention. However, it will be apparent that the present invention may be practiced without these specific details. Well-known components of the vehicle computer system environment monitor according to the present invention are shown in block diagram form, rather than in detail, to avoid unnecessarily obscuring the invention.

Referring to the FIGURE, a vehicle computer system environment monitor 10 according to the present invention includes ambient temperature monitoring circuitry 12 that provides a signal indicative of the ambient temperature to a vehicle computer system 14. The computer system 14 preferably is formed in accordance with the well-known IBM-PC architecture. A hard drive interface circuit 16 is connected between the computer system 14 and a hard drive 18 that is to be protected.

The hard drive interface electronics 16 provides both hardware and software interfaces between the hard disk 18 and the computer system 14. Upon power-up the hard drive interface electronics 16 isolates the hard drive from the rest of the computer system 14 until it is determined that the ambient temperature is within acceptable limits and enables the hard drive electronics 18.

When power is first applied to the computer system 14, the disk drive 18 is placed in a disabled state by the hard drive interface circuit 16. During the process of starting the computer system 14, firmware stored in silicon memory (not shown) in the computer system 14 allows the computer 14 to begin the boot process. Silicon memory is more reliable and tolerates extended temperature conditions better than the hard drive 18.

During the system boot the BIOS scans selected memory addresses for an extension signature in the basic input/output software (BIOS). If the signature is found, then control of the computer is given to the BIOS extension software, which then interrogates the ambient temperature monitoring circuitry 12. If the ambient temperature is within acceptable limits, the BIOS extension enables the hard disk and returns control of the computer system 14 to the regular system BIOS. At this point the boot process continues.

In the event that the BIOS extension finds that the ambient temperature circuits is outside acceptable limits the BIOS extension turns on an indicator 20 (for example a light or beeper) to inform the user of the out of temperature condition and then enters a loop that continuously monitors the ambient temperature. Once the ambient temperature is within limits, the BIOS extension enables the hard disk and returns control of the computer system to the regular system BIOS.

An exemplary embodiment of the invention is disclosed herein to explain how to make and use the invention. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. A method for booting a computer system that includes a disk drive and that uses basic input/output software for controlling the computer during the boot process, comprising the steps of:

applying electrical power to the computer;

disabling the disk drive;

providing to the computer a signal indicative of an ambient environmental parameter;

providing an extension in the basic input/output software for processing the signal indicative of the ambient environmental parameter to determine whether the ambient environmental parameter is within a predetermined limit for operating the disk drive; and proceeding with the boot process and enabling the disk drive only if the ambient environmental parameter is within the predetermined limit.

2. The method of claim 1, further comprising the step of activating an indicator to notify a user of the computer when the ambient environmental parameter is outside the predetermined limit.

3. The method of claim 1, further comprising the steps of:

continuously monitoring the ambient environmental parameter after it has been found to be outside the predetermined limit to determine when the ambient environmental parameter changes to a value that is within the predetermined limit; and enabling the disk drive after the environmental parameter is within the predetermined limit.

4. A method for protecting data stored in a disk drive included in a computer system that uses basic input/output software stored in a read only memory in the computer system for controlling the computer system during the boot process, comprising the steps of:

applying electrical power to the computer system;

disabling the disk drive so that it is isolated from the computer;

monitoring an ambient environmental parameter;

providing to the computer a signal indicative of a numerical value of the ambient environmental parameter;

providing an extension in the basic input/output software for processing the signal indicative of the ambient environmental parameter to determine whether the ambient environmental parameter is within a predetermined limit for operating the disk drive; and proceeding with the boot process and enabling the disk drive only if the ambient environmental parameter is within the predetermined limit.

5. The method of claim 4, further comprising the step of activating an indicator to notify a user of the computer system when the ambient environmental parameter is outside the predetermined limit.

6. The method of claim 4, further comprising the step of:

continuously monitoring the ambient environmental parameter after it has been found to be outside the predetermined limit to determine when the ambient environmental parameter changes to a value that is within the predetermined limit; and enabling the disk drive after the environmental parameter is within the predetermined limit.

7. A system for protecting data stored in a disk drive included in a computer system that uses basic input/output software stored in a read only memory in the computer system for controlling the computer system during the boot process, comprising:

means for disabling the disk drive so that it is isolated from the computer when electrical power is first applied thereto:

means for monitoring an ambient environmental parameter to provide to the
computer a signal indicative of a numerical value of the ambient environmental parameter; and
an extension in the basic input/output software for processing the signal indicative of the ambient environmental parameter to determine whether the ambient environmental parameter is within a predetermined limit for operating the disk drive for enabling the disk drive only if the ambient environmental parameter is within the predetermined limit.

8. The system of claim 7, further comprising indicator means for notifying a user of the computer system when the ambient environmental parameter is outside the predetermined limit.

9. The system of claim 8 wherein the extension is arranged to continuously monitor the ambient environmental parameter after an out of limit condition has occurred to determine when the ambient environmental parameter changes to a value that is within the predetermined limit and to enable the disk drive after the environmental parameter changes to a value within the predetermined limit.

10. A system for protecting data stored in a disk drive included in a computer system that uses basic input/output software stored in a read only memory in the computer system for controlling the computer system during the boot process, comprising:

an ambient temperature monitor arranged to provide to the computer a signal indicative of a numerical value of the ambient environmental parameter upon initial application of electrical power to the computer system;

disk drive interface circuitry connected between the compute and the disk drive and arranged to disable the disk drive so that the disk drive is isolated from the computer upon initial application of electrical power to the computer system: and an extension in the basic input/output software for processing the signal indicative of the ambient temperature to determine whether the ambient environmental parameter is within a predetermined limit for operating the disk drive for enabling the hard drive only if the ambient temperature is within the predetermined limit.

11. The system of claim 10, further comprising indicator means for notifying a user of the computer system when the ambient temperature is outside the predetermined limit.

12. The system of claim 11 wherein the extension is arranged to continuously monitor the ambient temperature after an out of limit condition has occurred to determine when the ambient temperature changes to a value that is within the predetermined limit and to enable the disk drive after the ambient temperature changes to a value within the predetermined limit.

* * * * *